United States Patent
Jones et al.

(10) Patent No.: US 9,737,900 B2
(45) Date of Patent: Aug. 22, 2017

(54) APPARATUS FOR IN-SITU PIPE COATING AND RELATED METHODS

(71) Applicant: 3M INNOVATIVE PROPERTIES COMPANY, St. Paul, MN (US)

(72) Inventors: Clinton L. Jones, Somerset, WI (US); Ryan B. Prince, St. Paul, MN (US); Cori S. Apel, Woodbury, MN (US); Scott M. Fabozzi, Lino Lakes, MN (US); Carson MacCallum, New Brunswick (CA); Shawn R. Sweeney, New Brunswick (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/655,591

(22) PCT Filed: Dec. 19, 2013

(86) PCT No.: PCT/US2013/076542
§ 371 (c)(1),
(2) Date: Jun. 25, 2015

(87) PCT Pub. No.: WO2014/105630
PCT Pub. Date: Jul. 3, 2014

(65) Prior Publication Data
US 2015/0367359 A1    Dec. 24, 2015

(51) Int. Cl.
*B05B 3/10* (2006.01)
*B05B 1/26* (2006.01)
(Continued)

(52) U.S. Cl.
CPC .............. *B05B 3/1014* (2013.01); *B05B 1/06* (2013.01); *B05B 3/1021* (2013.01);
(Continued)

(58) Field of Classification Search
CPC ..... B05B 3/1014; B05B 3/1064; B05B 13/06; B05B 13/0627; B05B 13/0636; B05D 1/02; B05D 7/222
(Continued)

(56) References Cited

U.S. PATENT DOCUMENTS

| 2,428,292 A | 9/1947 | Queen |
| 4,216,738 A | 8/1980 | Muta |

(Continued)

FOREIGN PATENT DOCUMENTS

| EP | 0145266 | 6/1985 |
| FR | 1335550 | 8/1963 |

(Continued)

OTHER PUBLICATIONS

International Search Report for PCT International Application No. PCT/US2013/076542 mailed on Apr. 16, 2014, 3 pages.
(Continued)

*Primary Examiner* — William Phillip Fletcher, III
(74) *Attorney, Agent, or Firm* — Gregg H. Rosenblatt

(57) ABSTRACT

An in-situ applicator for applying a composition in a pipe comprises a flow diverter configured to receive a composition and eject the composition from at least one outlet. The applicator also comprises a hollow conical body having a narrow end, a broad end, and an interior surface configured to receive the composition ejected from the flow diverter. The conical body also has a plurality of holes forming a band that wraps circumferentially around the conical body which defines a flow region on the interior surface between the band and the narrow end. The band includes first holes adjacent to the flow region where each of the first holes has a first average diameter and second holes disposed between the first holes and the broad end, each of the second holes having an average diameter greater than the first diameter.

14 Claims, 6 Drawing Sheets

(51) Int. Cl.
  *B05D 1/02* (2006.01)
  *B05D 7/22* (2006.01)
  *B05B 13/06* (2006.01)
  *F16L 58/10* (2006.01)
  *B05B 1/06* (2006.01)
  *B05B 1/14* (2006.01)

(52) U.S. Cl.
  CPC ............ *B05B 3/1064* (2013.01); *B05B 13/06* (2013.01); *B05B 13/0627* (2013.01); *B05B 13/0636* (2013.01); *B05D 1/02* (2013.01); *B05D 7/222* (2013.01); *F16L 58/1027* (2013.01); *B05B 1/14* (2013.01); *B05B 1/265* (2013.01)

(58) Field of Classification Search
  USPC ................... 427/230–239; 239/567; 118/317
  See application file for complete search history.

(56) References Cited

U.S. PATENT DOCUMENTS

| | | | |
|---|---|---|---|
| 5,419,496 A | 5/1995 | Novak, Jr. | |
| 6,730,353 B2 | 5/2004 | Robinson | |
| 6,969,427 B1 | 11/2005 | Noles, Jr. | |
| 6,986,813 B2 | 1/2006 | Davis | |
| 7,189,429 B2 | 3/2007 | Robinson | |
| 7,338,687 B2 | 3/2008 | Davis | |
| 7,591,901 B1 | 9/2009 | Weisenberg | |
| 2012/0058264 A1 | 3/2012 | Filou | |

FOREIGN PATENT DOCUMENTS

| | | | |
|---|---|---|---|
| JP | 61293571 A2 | | 12/1986 |
| JP | 2010-274200 A | * | 9/2010 |
| JP | 2010-274200 | | 12/2010 |
| KR | 2009-0008797 | | 1/2009 |
| RU | 2305011 | | 8/2007 |
| SU | 1297932 | | 3/1987 |
| WO | WO 2012-161774 | | 11/2012 |
| WO | WO 2014-105630 | | 7/2014 |

OTHER PUBLICATIONS

Russian Search Report for Application No. 2015126455, dated Aug. 25, 2016, 2pgs.

* cited by examiner

APPARATUS FOR IN-SITU PIPE COATING AND RELATED METHODS

TECHNICAL FIELD

This disclosure relates generally to in-situ pipe coating, and more particularly, to centrifugal resin application with a coating cone.

BACKGROUND

Infrastructure pipelines that carry fluids such as potable water, gas, and wastewater deteriorate over time due to their extensive use. This deterioration can lead to leaks and bursts resulting in costly damage if the pipelines are not maintained. Since these pipelines are typically located underground and provide essential utilities, maintenance and rehabilitation is preferably performed with as minimal disruption to service as possible. Several methods for performing in-situ maintenance and rehabilitation on these pipes, known as trenchless methods, have been developed. One such method involves feeding an applicator device through the pipe to spray a material along the interior surface of the pipe. The material then hardens to form a new, interior liner surface to seal cracks and strengthen the existing pipeline.

SUMMARY

An embodiment of the present disclosure is directed to an in-situ applicator for applying a composition in a pipe. The applicator comprises a flow diverter and a hollow conical body. The flow diverter is configured to receive the composition and eject the composition from at least one outlet. The hollow conical body has a narrow end, a broad end, and an interior surface configured to receive the composition ejected from the flow diverter. The conical body also has a plurality of holes forming a band that wraps circumferentially around the conical body and defines a flow region on the interior surface between the band and the narrow end. The band includes first holes adjacent to the flow region where each of the first holes has a first average diameter and second holes disposed between the first holes and the broad end, each of the second holes having an average diameter greater than the first diameter. The flow region is devoid of holes and has a first, second, third, and fourth inclined side where proximate ends of the first and second sides converge toward the narrow end and proximate ends of the third and fourth sides converge toward the narrow end in a mirror image of the proximate ends of the first and second sides.

Another embodiment is directed to a method. The method involves providing an applicator having a flow diverter and a hollow conical body as set forth above. A composition is fed to the flow diverter, and the composition is ejected from the at least one outlet to collect on the interior surface of the hollow conical body. The hollow conical body is rotated so that the collected composition flows over the flow region toward the plurality of holes and sprays outwardly from the hollow conical body through at least two of the plurality of holes.

A further embodiment is directed to an apparatus. The apparatus includes an input tube and an outlet portion. The input tube has a first axis, a first diameter, and an opening at a proximate end. The outlet portion has a second diameter and is arranged at the distal end of the input tube with a domed end transverse to the first axis. The outlet portion comprises at least two outlets arranged perpendicular to the first axis.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The following figure descriptions are presented in connection with various embodiments of the disclosure.

In the figures, like reference numerals designate like elements.

DETAILED DESCRIPTION

Figure 1:
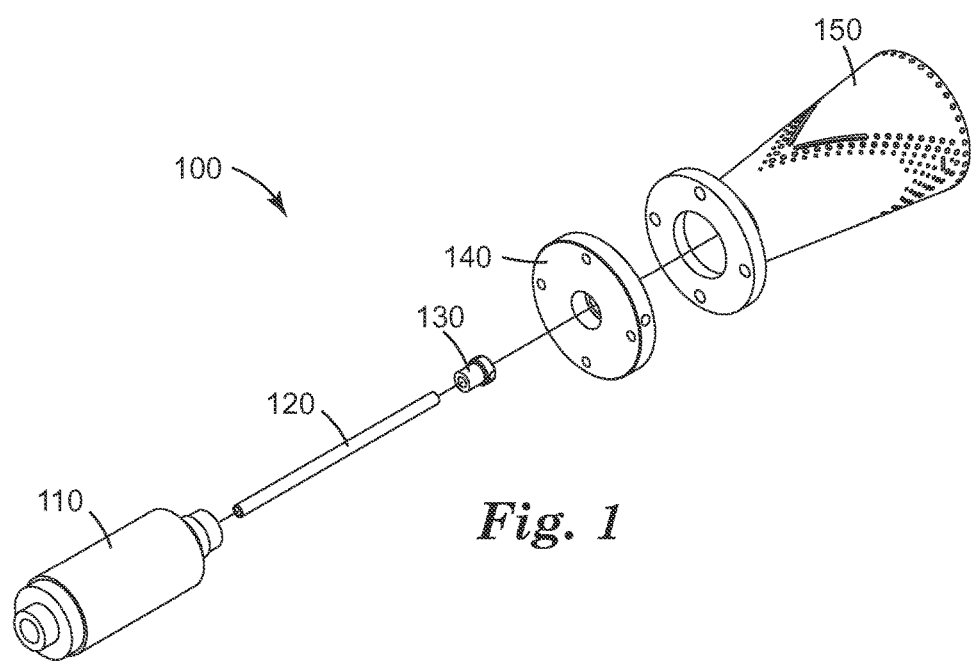
FIG. 1 is an exploded parts view of a resin applicator.

One technique for spray coating the interior surface of a pipe involves centrifugally spraying a liquid liner, or resin composition, with a hole-patterned cone. This technique provides increased uniformity in the resulting liner. However, the technique can also result in coating defects such as sagging, lumping, or ringing. These defects occur, for example, when the ejected resin flows down the surface of the pipe before hardening, flows out the end of an open cone, or the rate at which the cone is fed through the pipe is irregular while steady-state resin delivery is maintained. Further complications arise when the resin clogs the holes of the cone and/or builds up inside the cone clogging the holes and/or the resin spray device thereby further preventing the cone from spinning. Clogs can range from a blockage of a few of the holes on the cone pattern or spray outlet(s) to filling the entire cone with hardened resin resulting in the inability to complete the lining application. Clogs that inhibit the uniform coating ability of the cone require extraction of the cone from the pipe for manual resin removal and typically also result in defects in the liner at that location in the pipe. Further, damage can occur to the cone during extraction of the hardened resin resulting in a need for a replacement cone.

Many factors influence the final pipe coating caliper and integrity, one of which is the resin chemistry. For example, fast setting, high viscosity, statically mixed, polyurea coating chemistries harden to at least a tack-free state in a matter of seconds once applied to the interior surface of a pipe (or to portions of the coating applicator). These resin chemistries are typically two-part chemistries including a first part comprising one or more aliphatic polyisocyanates, optionally blended with one or more amine reactive resins and/or non-reactive resins and a second part comprising one or more polyamines optionally blended with one or more oligomeric polyamines. The two parts, when mixed together and applied to the internal surfaces of pipelines, form a rapid setting impervious coating suitable for contact with drinking water.

The first part aliphatic polyisocyanate(s) may be any organic isocyanate compound containing at least two isocyanate functional groups, said isocyanate groups being aliphatic in nature. Suitable polyisocyanates include hexamethylene-1,6-diisocyanate; 2,2,4-trimethylhexamethylene diisocyanate; isophorone diisocyanate; and 4,4'-dicyclohexylmethane diisocyanate. Alternatively, reaction products or prepolymers derived from the above may be utilized, such as, polyisocyanate derivatives of hexamethylene-1,6-diisocyanate. The polyisocyanate compounds typically have an isocyanate content of between 5 weight percent (wt %) and 50 wt %, and more specifically, 20-25 wt %. The amine reactive resin(s) of the first part can be any compound containing functional groups which are capable of reacting with primary or secondary amines. Useful materials include epoxy functional compounds and any compounds containing ethylenically unsaturated bonds capable of undergoing "Michael Addition" with polyamines, e.g. monomeric or oligomeric polyacrylates. Non-reactive resins may also be used if they have no adverse effects on water or gas quality during pipe operation.

The second part of the two part coating comprises one or more polyamines. As used herein, polyamine refers to compounds having at least two amine groups, each containing at least one active hydrogen (N—H group) selected from primary amine or secondary amine. In some embodiments, the second component comprises one or more secondary amines. In certain embodiments, the amine component comprises at least one aliphatic cyclic secondary diamine.

In one embodiment, the second part comprises one or more aliphatic cyclic secondary diamines that comprise two, optionally substituted, hexyl groups bonded by a bridging group. Each of the hexyl rings comprises a secondary amine substituent.

The aliphatic cyclic secondary diamine typically has the general structure:

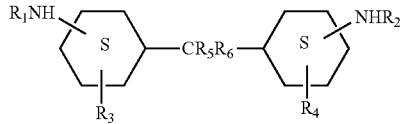

(Formula 1)

wherein $R_1$ and $R_2$ are independently linear or branched alkyl groups, having 1 to 10 carbon atoms. $R_1$ and $R_2$ are typically the same alkyl group. Representative alkyl groups include methyl, ethyl, propyl, isopropyl, butyl, isobutyl, secondary butyl, tertiary butyl, and the various isomeric pentyl, hexyl, heptyl, octyl, nonyl, and decyl groups. The symbol "S" in the center of the hexyl rings indicates that these cyclic groups are saturated. The preferred $R_1$ and $R_2$ contain at least three carbons, and a butyl group is particularly favored, such as a sec-butyl group.

$R_3$, $R_4$, $R_5$, and $R_6$ are independently hydrogen or a linear or branched alkyl group containing 1 to 5 carbon atoms. $R_3$ and $R_4$ are typically the same alkyl group. In some embodiments, $R_5$ and $R_6$ are hydrogen. In some embodiments, $R_3$ and $R_4$ are methyl or hydrogen.

The substituents are represented such that the alkylamino group may be placed anywhere on the ring relative to the $CR_5R_6$ group. Further, the $R_3$ and $R_4$ substituents may occupy any position relative to the alkylamino groups. In some embodiments, the alkylamino groups are at the 4,4'-positions relative to the $CR_5R_6$ bridge. Further, the $R_3$ and $R_4$ substituents typically occupy the 3- and 3'-positions.

In another embodiment, the second part comprises one or more aliphatic cyclic secondary diamines that comprise a single hexyl ring. The aliphatic cyclic secondary diamine typically has the general structure:

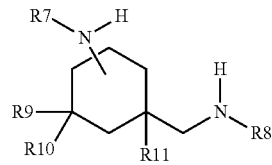

(Formula 2)

wherein $R_7$ and $R_8$ are independently linear or branched alkyl groups, having 1 to 10 carbon atoms or an alkylene group terminating with a —CN group. $R_7$ and $R_8$ are typically the same group. Representative alkyl groups include the same as those described above for $R_1$ and $R_2$. In one embodiment, $R_7$ and $R_8$ are alkyl groups having at least three carbons, such as isopropyl. In another embodiment, $R_7$ and $R_8$ are short chain (e.g. C1-C4) alkylene groups, such as ethylene, terminating with a —CN group.

$R_9$, $R_{10}$, and $R_{11}$ are independently hydrogen or a linear or branched alkyl group having 1 to 5 carbon atoms. $R_9$, $R_{10}$, and $R_{11}$ are typically the same alkyl group. In some embodiments, $R_9$, $R_{10}$, and $R_{11}$ are methyl or hydrogen. In one embodiment $R_9$, $R_{10}$, and $R_{11}$ are methyl groups.

The substituents are represented such that the alkylamino group may be placed anywhere on the ring relative to the —$NR_8$ group. In some embodiments, the alkylamino group is two or three positions away from the —$NR_8$. The preferred alkylamine group is two positions away from the —$NR_8$ group on the cyclohexyl ring.

Alternatively the polyamine(s) of the second part may render the resin suitable for coating pipes that transport fluids such as wastewater or gas. Exemplary fast setting resin chemistries that may be employed with the disclosed apparatus and methods are further described in U.S. Pat. Nos. 6,730,353 and 7,189,429 (both to Robinson) and in PCT Application No. WO20120161774 (to Prince et al.). An exemplary commercially available resin is 3M SCOTCH-KOTE Pipe Renewal Liner 2400. While the disclosed apparatus and methods may be employed with a variety of resin chemistries, substantially uniform coating has been attained for resin chemistries with tack-free times in the range of 10-90 seconds, and more preferably, less than 30 seconds. More preferably, substantially uniform coating may be attained for resin chemistries having a tack-free time of 24.5±1.7 seconds. These relatively fast tack-free times provide for a return-to-service of the pipe approximately two hours after coating is completed.

In addition to chemistries with relatively fast tack-free times as discussed above, compositions with a variety of chemistries and varying tack-free times may be used with disclosed embodiments. For example, polyurethanes including aromatic isocyanates and a polyol may be used.

Other factors influencing the final pipe coating caliper and integrity include volumetric flow rates, coating head speed, linear coating speed, resin viscosity during the coating process, and design of the cone. For example, the size of a coating cone selected for application of a resin depends upon the diameter of the pipe to be coated. Typically the broad end of the coating cone has at least a one inch clearance from the interior pipe surface. Also, the longer the pipeline to be coated, the more resin that needs to be pumped through the applicator. This factor increases in importance as increased coating calipers, for example up to 8.5 millimeters for a single pass coating, are desired. As volumetric flow rates increase, and coating head rotational speed remains constant, coating cones with greater surface area are required. The coating cone should be designed to apply the widest spray band possible for a given flow rate and pipe diameter. The spray band is defined as the maximum longitudinal distance that resin flows down the cone in the direction primarily parallel to the pipe while exiting the cone in a direction primarily orthogonal to the pipe wall. More efficient use of coating cone length and the larger resulting spray bands, increase the uniformity of the resin application and final lining caliper. These factors alone, and in combination, are considered when selecting a resin applicator for in-situ pipe maintenance and rehabilitation.

Turning now to FIG. 1, various components of resin applicator 100 are shown. Motor 110 is connected to a power source and resin input tubing (not shown). Motor 110 typically is an air motor and sustains an operation speed in the range 8,000-10,000 rpm but can operate at a speed of up to 14,000 rpm. Resin feed tube 120 through motor 110 connects flow diverter 130 to resin feed tube 120. Optional stabilizer 140 couples motor 110 to coating cone 150. During operation of motor 110, coating cone 150 (and stabilizer 140) rotate while flow diverter 130 and resin feed tube 120 do not rotate and remain relatively stationary with respect to coating cone 150. While stabilizer 140 is illustrated as a ring, it can be formed of any variety of shapes so long as coating cone 150 and motor 110 can securely attach thereto. While resin applicator 100 can operate without stabilizer 140, stabilizer 140 enhances a balanced, secure attachment for coating cone 150 to motor 110. Without stabilizer 140, prolonged operation of motor 110 at 8,000-10,000 rpm can loosen a direct connection of coating cone 150 to motor 110. Loosening of a cone results in an irregular spray pattern or band and increased defects in the pipe lining. When a cone loosens, the application process is temporarily halted so that the resin applicator can be extracted from the pipe and the cone re-secured (and cleaned if necessary). The applicator can then be re-inserted into the pipe and the application process re-started.

Figure 2:
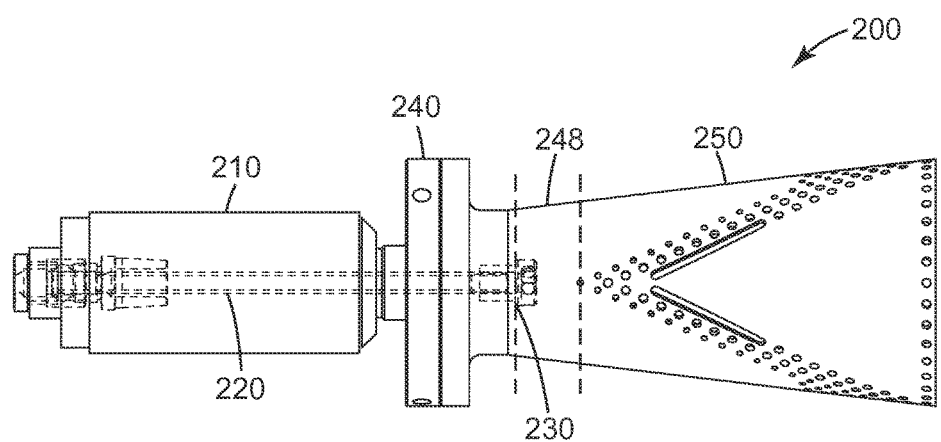
FIG. 2 is an assembled view of a resin applicator.

Similar to the above description of components, FIG. 2 illustrates assembled resin applicator 200. Stabilizer 240 connects coating cone 250 to motor 210. Resin feed tube 220 connects through the center of motor 210 to position flow diverter 230 centrally within coating cone 250. Flow diverter 230 may also be positioned within coating cone 250 to provide a resin distribution zone 248 on the interior surface of coating cone 250. The distance the resin travels substantially parallel to the center axis of the cone defines resin distribution zone 248. For example, flow diverter 230 may be positioned so as to allow ejected resin to flow over about one inch of cone interior surface before reaching the first holes of the hole pattern of coating cone 250. Resin distribution zone 248 can vary in length depending on the length of coating cone 250 and/or the length of the hole pattern on coating cone 250. Motor 210 typically includes a support structure to arrange motor 210 approximately in the center of the pipe being coated. Connections to motor 210 and/or support structure may be used to move motor 210 along the pipe during coating, for example, by pulling resin applicator 200, motor first, via extracting the connections above ground at the resin source.

Figure 3A:
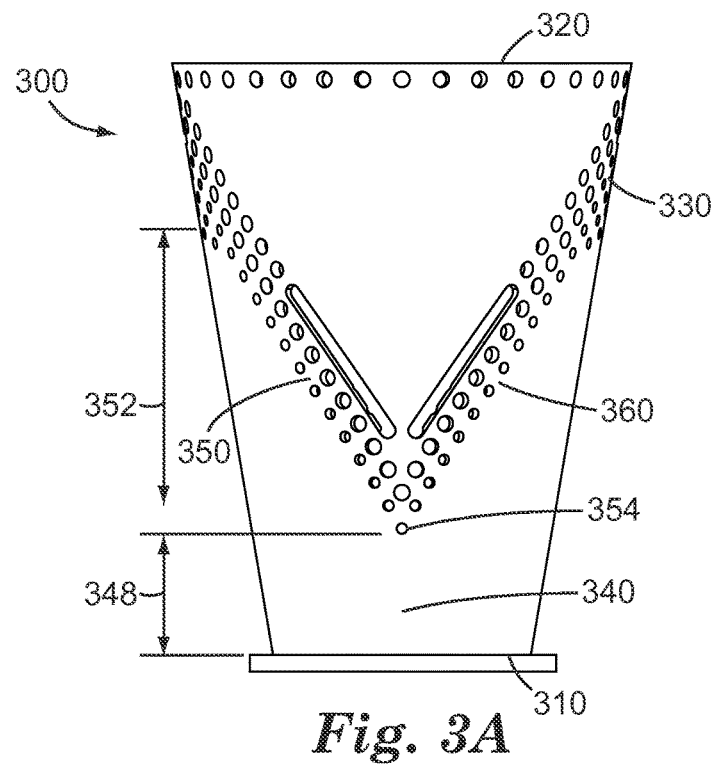
FIGS. 3A and 3B are side-by-side views of a ninety degree turn of a coating cone.
Figure 3B:
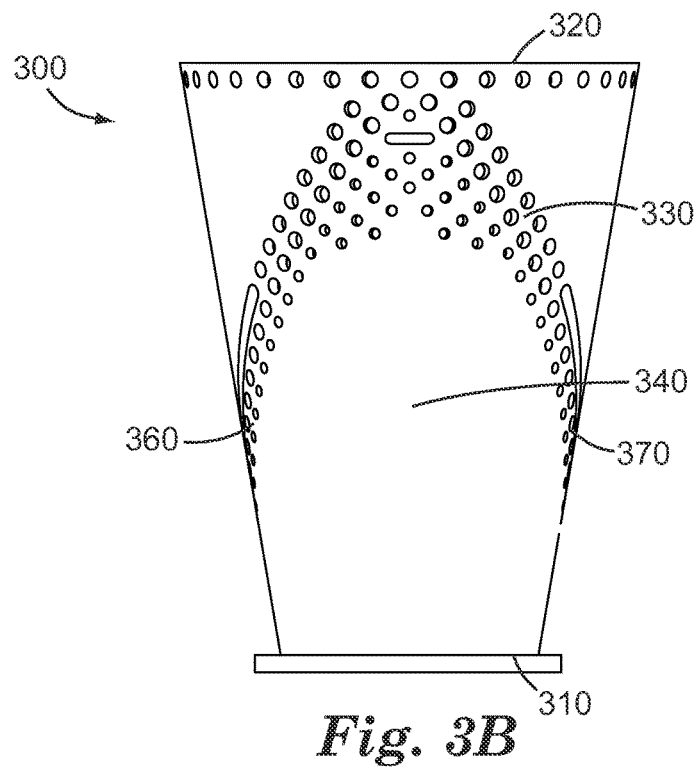

A coating cone may be either a closed cone design or an open cone design, as illustrated in FIGS. 3A and 3B. A closed cone is closed at the broad end so that resin is ejected into the cone and deflected off the closed end before being sprayed into a pipe. A closed cone is typically paired with a single outlet flow diverter where the resin is fed into the cone parallel to the longitudinal, center axis of the cone toward the closed end. An open cone is open at the broad end rendering the possibility of resin escaping the cone through the broad end if the resin is not ejected through the hole pattern first. Resin is ejected into an open cone toward the inner surface of the cone, e.g., perpendicular to the center axis of the cone. Regardless of design, open or closed, a coating cone may be constructed of a variety of materials including aluminum, steel, or durable plastic.

FIGS. 3A and 3B are different views of the same open cone 300, where FIG. 3B is cone 300 rotated ninety degrees around a vertical axis from the view of FIG. 3A. Cone 300 includes narrow end 310 and broad end 320. The hole pattern of cone 300 forms band 330 of a plurality of holes that wraps entirely around cone 300. Band 330 of holes defines flow region 340 as the portion of the interior surface of cone 300 from narrow end 310 up to band 330. Flow region 340 has four inclined sides, first inclined side 350, second inclined side 360, third inclined side 370, and a fourth inclined side, which is not shown. First and second inclined sides 350 and 360 converge toward narrow end 310, while third and fourth inclined sides 370 also converge toward narrow end 310 on the opposing side of cone 300 to form a mirror image. The term mirror image is used to describe the symmetrical design on opposing halves (sections located 180 degrees apart) of cone 300 and does not require both sections to be identical (e.g., in hole diameters and spacing).

Flow region 340 may be considered in two zones: resin distribution zone 348 and resin flow zone 352. Resin distribution zone 348 is located from narrow end 310 to the circumference of cone 300 at the closest holes to narrow end 310 (e.g., hole 354). Resin flow zone 352 is the triangular regions of interior surface of cone 300 defined by the circumference of cone 300 at the closest holes to narrow end 310 (e.g., hole 354) and the four inclined sides. The two triangular regions of resin flow zone 352 form mirror images of each other.

Figure 4:
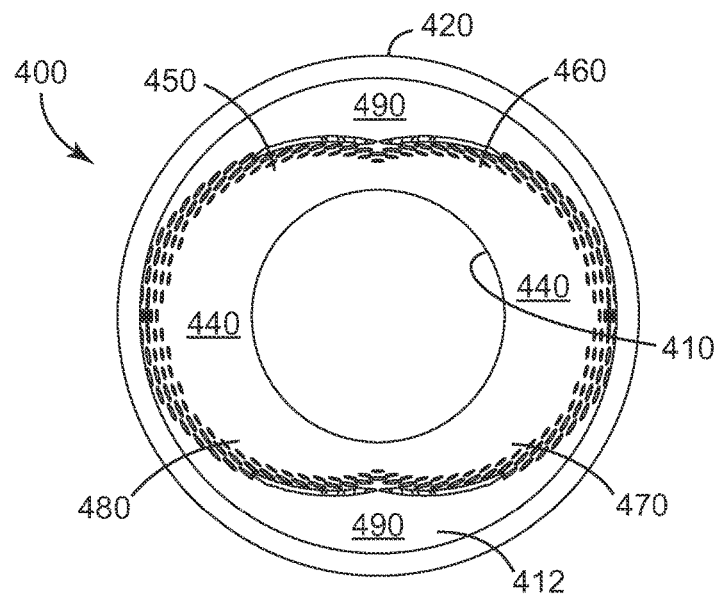
FIG. 4 is a top-down view of the interior surface of a coating cone.

FIG. 4 provides a top down view of cone 400. More specifically, the view is down the center of interior surface 412 of cone 400 from broad end 420. Similar to the above discussion, cone 400 has a dual V, or dual chevron, pattern of holes defining flow region 440 from narrow end 410 up to the holes. Flow region 440 includes four inclined sides, first inclined side 450, second inclined side 460, third inclined side 470, and fourth inclined side 480. Similar to the discussion above, first and second inclined sides 450, 460 converge toward narrow end 410 to form a first V shape, or chevron, and third and fourth 470, 480 inclined sides converge toward narrow end 410 to form a second V shape, or chevron. Opposing flow region 440, non-flow region 490 is defined by the portion of cone 400 from the pattern of holes to broad end 420. Little to no resin should enter non-flow region 490 as it should have been ejected through the hole pattern. Since no resin should be contacting non-flow region 490, non-flow region 490 can have a variety of features or patterns. For example, non-flow region 490 may be a solid interior surface (as shown), may include one or more holes or other shaped apertures, or non-flow region 490 may be entirely open.

Figure 5:
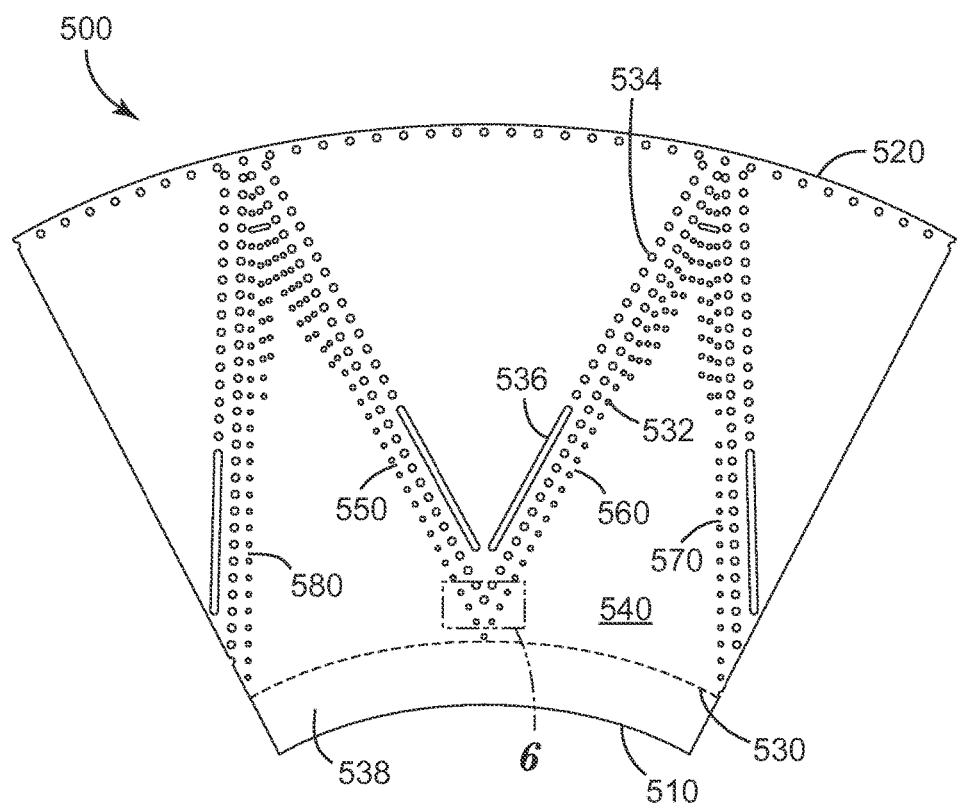
FIG. 5 is a landscape view of the hole pattern of a coating cone.

An exemplary coating cone hole pattern is shown in FIG. 5 as a landscape view of "unwrapped" cone 500. Flow region 540 is defined on the interior surface of cone 500 as the area between narrow end 510 and the plurality of holes. Flow region 540 includes four inclined sides, first inclined side 550, second inclined side 560, third inclined side 570, and fourth inclined side 580. The plurality of holes include first holes 532 located adjacent flow region 540 and second holes 534 located between first holes 532 and broad end 520. All holes not adjacent to flow region 540 are second holes 534. Second holes 534 of the hole pattern of cone 500 also include elongated holes 536. Elongated holes 536 are holes not adjacent to flow region 540 and have an average diameter at least twice as large as the average diameter of first holes 532. The measurement of a diameter of a non-circular shape is taken along the longest axis between two opposing points of the shape. The term "diameter" is not limited to items or shapes that are circular. Elongated holes 536 serve as a safety measure to eject any resin remaining in the cone after flowing past first holes 532 and any other second holes 534. This enhances utilization of the length of the cone resulting in a wider spray band and more uniform caliper lining. As a further preventative measure, a row of holes is disposed around the circumference of cone 500 at broad end 520. This last row is configured to eject all remaining resin and prevent excess resin from leaving the cone through the open end, which would generate defects in the pipe lining such as clumping or ringing. An inner cone diameter 530 distinguishes between resin distribution zone 538 and resin flow zone 542.

While first and second holes 532, 534, with the exception of elongated holes 536, are typically circular in shape, there may be irregularities due to milling or manufacture of cone 500. In certain embodiments, such as smaller sized cones, first and second holes 532, 534, with the exception of elongated holes 536, have about the same average diameter. In other embodiments, second holes 534 have an average diameter larger than the average diameter of first holes 532. In embodiments utilizing fast setting resins, such as those discussed above, the smallest hole diameter can be one sixteenth of an inch (1.5 mm) to avoid clogging the holes of the cone. The average hole diameters for first and second holes 532, 534 are selected based on the resin chemistry being employed (e.g., viscosity and/or tack-free time), the size of the pipe being coated, and/or the flow rate of resin application.

Figure 6:
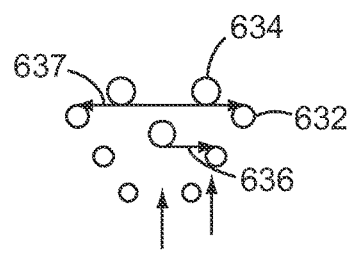
FIG. 6 is a close-up view of the holes illustrated in the inset box of FIG. 5.

FIG. 6 provides an example of the spacing of first and second holes 632, 634 of the hole pattern illustrated in the dashed box of FIG. 5. Second holes 634 form a nested row with first holes 632. More specifically, second holes 634 are positioned offset from first holes 632 so as to eject resin that flows between first holes 632. In this embodiment, the bottom of second holes are aligned with the top of first holes along horizontal planes 636, 637 to provide the offset. For example, resin ejected from a flow diverter would flow through a resin distribution zone and spray out of the cone as it reaches first holes 632. However, if the resin flows past first holes 632, it can reach one of second holes 634 due to the offset positioning. To further ensure resin ejection, second holes 634 may be spaced apart from first holes no more than one average diameter of first holes 632. When second holes 634 form more than one nested row, such spacing may be continued for each of the nested rows of second holes 634.

Figure 7:
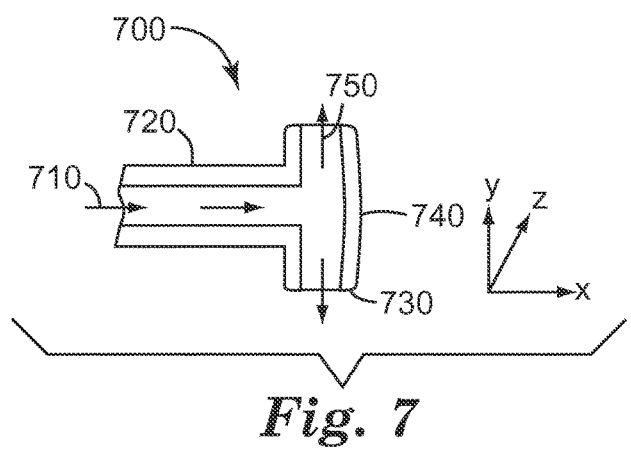
FIG. 7 is a cross-section view of a flow diverter.

FIG. 7 illustrates a cross-section of example flow diverter 700 of a resin applicator. Flow diverter 700 includes tube 720 having a first diameter and opening 710 at a proximate end along a first axis. Opening 710 may be the resin input to flow diverter 700. The flow diverter 700 further includes an outlet portion 730 having a second diameter arranged at the distal end of tube 720. Outlet portion 730 includes domed end 740 transverse to the first axis. While domed end 740 is domed such that the surface is a continuous curved surface, convex with respect to tube 720, the term "domed" does not require a specific angle of arcing or that the curved surface be symmetrical. Domed end 740 has a smooth continuous surface to discourage ejected resin from collecting on flow diverter 700.

Domed end 740 also includes at least one outlet 750 arranged perpendicular to the first axis. In one embodiment outlets 750 eject the resin from flow diverter 700 at a ninety degree angle with respect to the first axis. Thus, the resin first contacts the inner surface of a coating cone directly opposite outlets 750. In other embodiments, outlets 750 are angled so that the resin is ejected at an angle greater than ninety degrees (e.g., 105 degrees) with respect to the first axis. Thus, the resin first contacts the inner surface of a coating cone further along the cone, or forward, than if outlets 750 were not angled. Angling outlets 750 enables the resin to utilize more of the length of interior cone surface in larger (e.g., longer) cones to increase the size of the spray band and resulting caliper uniformity. Outlets 750 may vary in diameter based upon the resin applied, amount of resin, and flow rates for application. For example, larger flow rates and/or lower viscosity resins would be paired with larger outlet diameters. An example outlet diameter for the fast-setting resin described above would be about a quarter inch (6.35 mm).

Figure 8:
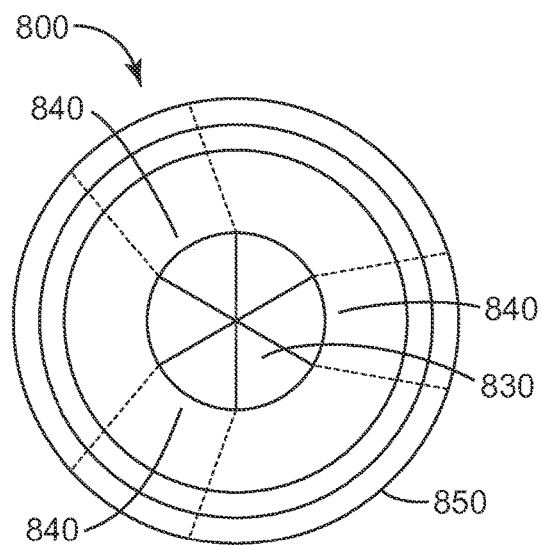
FIG. 8 is a top-down view of a flow diverter assembled inside a coating cone.

A top-down view of an assembled 800 flow diverter 830 and coating cone 850 is provided in FIG. 8. Coating cone 850 surrounds flow diverter 830. In this example embodiment, flow diverter 830 includes three outlets 840 spaced equidistant (one hundred twenty degrees) apart, measured from the center of the outlets. While not visible from the top-down angle, the central portion of flow diverter 830 is a smooth, curved surface. With the smooth, curved surface, flow diverter 830 is assembled by hand, e.g., screwed into a resin input tube. Coating cone 850 can then be attached over flow diverter 830 when the largest diameter of flow diverter 830 is smaller than the smallest diameter of coating cone 850. Rotating coating cone 850 sprays the resin centrifugally outward towards the interior surface of the pipe being coated.

Figure 9:
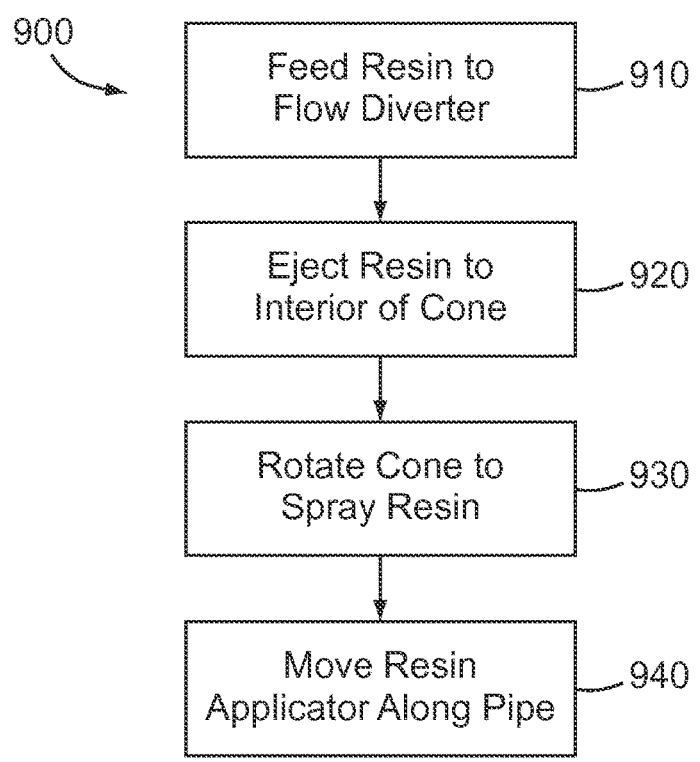
FIG. 9 is a flow chart of a method for applying a resin with a coating cone.

FIG. 9 illustrates an example method 900 for in-situ coating of a pipe. Resin is fed to a flow diverter of resin applicator 910, for example, a resin applicator discussed herein. Depending on the length and location of the pipe to be coated, the resin may be fed from tanks located above ground. Such tanks may be included in a mobile apparatus configured to deliver resin chemistry to a job site. The resin is ejected from the flow diverter to the interior surface of coating cone 920. As discussed herein, the resin may be ejected at a ninety degree angle, or greater, to the interior surface based on the outlet ports of the flow diverter. The coating cone is rotated to spray the ejected resin outward toward the interior surface of the pipe being coated 930. To continuously coat the interior of the pipe, the resin applicator is moved longitudinally along the interior of the pipe at a predetermined rate 940. The predetermined rate is selected to provide a uniform, consistent coating caliper on the interior surface of the pipe. The resin applicator may be repositioned by extracting connections to the resin applicator such as a power source or resin input tubing. Depending on the length of the pipe being coated this may include winding the connections around a rotating drum. While the winding can be performed manually, it is more typically performed automatically to provide the predetermined rate of movement continuously for the resin applicator.

EXAMPLES

In-situ applicators were assembled according to the disclosure as a hollow conical body or a cone, a flow diverter, and a stabilizer. The components were characterized via the following test procedures to establish flow rate and resin coat caliper or thickness.

Test Methods

Flow Rate

Flow rate was determined using a calibrated set of flow meters connected to an Allen Bradley Panel View Plus 700 programmable logic controller (PLC), obtained from Rockwell Automation Inc, Milwaukee, Wis. Two VSE Precision Flow Meters Model VS 1 available from IC Flow Controls, Inc. Normal, Ill. measured flow rate on the first and second part resin lines. The volumetric flow rate from the first part line and the measurement from second part line were summed together and reported as a combined total flow rate. Volumetric flow rate was recorded at the PLC every 8 to 10 seconds during a lining trial. Air motor operation was held constant at 10,000 rpm throughout the test.

Caliper Test

The process for determining the thickness of the resin coated in the pipe by the in-situ applicator was performed as follows. A 6.1 meter (20 feet) section of polyvinyl chloride (PVC) pipe was coated with resin and allowed to cure for one hour. The coated PVC pipe was cross-sectioned cut at 0.9 m (3 feet), 3.0 m (10 feet), and 5.2 m (17 feet) from the end of the pipe. The coating was removed from the pipe. An Absolute Digimatic Caliper from Mitutoyo America Corp, Aurora, Ill. was used to measure the caliper, or thickness, of the resin coating around the circumference at twelve hour hand intervals.

In-Situ Applicator Assembly

Table 1 summarizes dimensional characteristics of exemplary cones used for applying a composition in a pipe. The flow zone surface area was computed as the surface that is exposed to the resin as it is ejected from the flow diverter. Flow zone surface area was approximated as two triangles in FIG. 5 within flow region 540 between plurality of first holes 532 from narrow end inner cone diameter 530 toward broad end cone diameter 520.

TABLE 1

Cone Dimensional Summary

| Characteristic | Cone 1 mm | Cone 2 mm | Cone 3 mm |
| --- | --- | --- | --- |
| Broad End Cone Diameter | 48.0 | 70.0 | 100.0 |
| Narrow End Cone Diameter | 19.0 | 35.0 | 50.0 |
| Inner Cone Diameter | 46.0 | 72.5 | 80.5 |
| Length of Pattern on the Cone | 52.8 | 100.4 | 164.3 |
|  | mm² | mm² | mm² |
| Cone Flow Surface Area | 2,427.5 | 7,275.4 | 13,217.2 |

Table 2 summarizes the exemplary hole pattern and dimensional characteristics on the hollow conical bodies used for applying a composition in a pipe.

TABLE 2

Hole Pattern and Dimensional Summary

| Characteristic | Cone 1 mm | Cone 2 mm | Cone 3 mm |
| --- | --- | --- | --- |
| 1$^{st}$ Row Hole Diameter | 1.6 | 1.6 | 1.6 |
| 2$^{nd}$ Row Hole Diameter | 1.6 | 2.4 | 2.4 |
| Elongated Hole Length | 15.0 | 30.0 | 45.0 |
| Number of 1$^{st}$ Row Holes | 72.0 | 72.0 | 112.0 |
| Number of 2$^{nd}$ Row Holes | 162.0 | 162.0 | 278.0 |
| Number of 2$^{nd}$ Row Elongated Holes | 4.0 | 4.0 | 4.0 |
|  | mm² | mm² | mm² |
| 1$^{st}$ Row Single Hole Surface Area | 2.0 | 2.0 | 2.0 |
| 2$^{nd}$ Row Single Hole Surface Area | 2.0 | 4.5 | 4.5 |
| 2$^{nd}$ Row Single Elongated Hole Surface Area | 23.8 | 71.4 | 107.2 |
| 1$^{st}$ Row Hole Surface Area | 142.5 | 142.5 | 221.7 |
| 2$^{nd}$ Row Hole and Elongated Hole Surface Area | 415.9 | 1,007.2 | 1,666.7 |
| Total Hole Surface Area | 558.4 | 1,149.7 | 1,888.4 |

Table 3 summarizes dimensional characteristics of the exemplary flow diverter used for applying a composition in a pipe.

TABLE 3

Flow Diverter Dimensional Summary

| Characteristic | Cone 1 | Cone 2 | Cone 3 |
| --- | --- | --- | --- |
|  | mm | mm | mm |
| Outer Diameter | 13.0 | 15.9 | 19.4 |
| Inner Diameter | 10.0 | 10.8 | 12.9 |
| Flow Diverter Length | 16.0 | 20.7 | 29.2 |
|  | radians | radians | radians |
| Incident Angle | $\frac{\pi}{2}$ to $\frac{3\pi}{4}$ | $\frac{\pi}{2}$ to $\frac{3\pi}{4}$ | $\frac{\pi}{2}$ to $\frac{3\pi}{4}$ |
| Angle Between Outlets | $\frac{2\pi}{3}$ | $\frac{2\pi}{3}$ | $\frac{2\pi}{3}$ |

Table 4 summarizes dimensional characteristics of the exemplary stabilizer used for applying a composition in a pipe.

TABLE 4

Stabilizer Dimensional Summary

| Characteristic | Cone 1 mm | Cone 2 mm | Cone 3 mm |
| --- | --- | --- | --- |
| Outer Diameter | 48.0 | 61.0 | 61.0 |
| Middle Diameter | 19.0 | 34.0 | 34.0 |
| Inner Diameter | 12.0 | 14.0 | 17.0 |
| Outer Width | 15.0 | 16.0 | 18.0 |
| Inner Width | 10.0 | 10.0 | 12.0 |

Examples 1-3

Flow Rate and Surface Area Ratio

In accordance with the disclosure, the hollow conical body or cone was designed to uniformly apply the composition in a pipe for varying flow rates. As was described in the test methods, a maximum flow rate was calculated for each cone. The flow rate was used to determine a ratio of the hole surface area to the flow surface area of the cone. It was determined that substantially uniform resin coating resulted when the resin exited from the first row of the hole pattern. Computed flow rates in liters per minute (LPM) and surface area ratios are summarized in Table 5.

TABLE 5

Surface Area Ratio Based on Flow Rate

| Characteristic | E1 | E2 | E3 |
|---|---|---|---|
| Cone | Cone 1 | Cone 2 | Cone 3 |
| Maximum Flow Rate (LPM) | 4.0 | 6.0 | 8.0 |
| 1$^{st}$ Row Hole Surface Area (mm$^2$) | 142.5 | 142.5 | 221.7 |
| Cone Flow Surface Area (mm$^2$) | 2,427.5 | 7,275.4 | 13,217.2 |
| Ratio of Surface Areas | 3:50 | 1:50 | 1:50 |

The ratio of first row hole surface area and the cone flow surface area is between 3:50 and 1:50 to produce a uniform line coat at or below the maximum flow rate for each cone.

Examples 4-6

Composition or Resin Caliper for a One-Outlet Diverter

Figure 10:
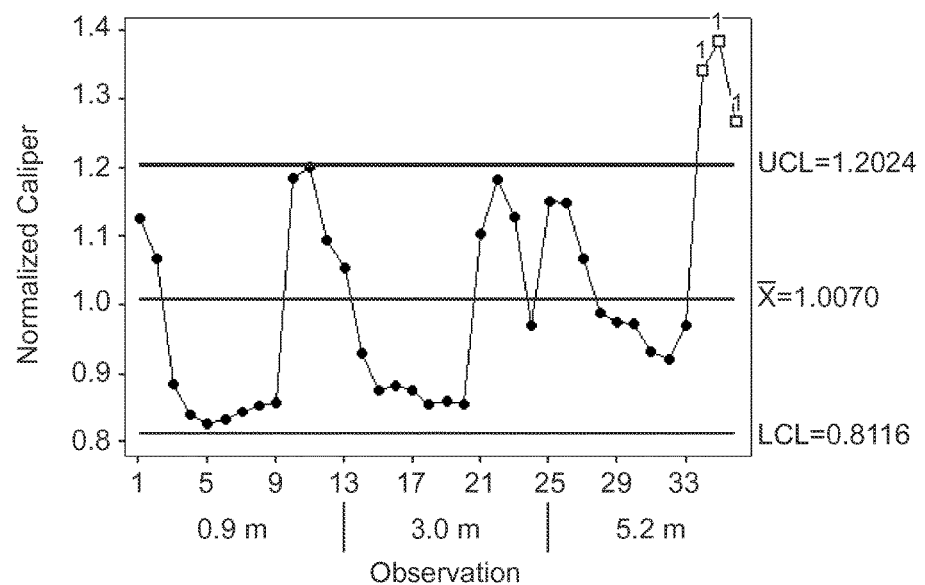
FIG. 10 is a graph of caliper measurements using a single outlet flow diverter.

Caliper of an applied liner was determined by coating a length of pipe and cutting the pipe into three cross sections at 0.9 m (3 feet), 3.0 m (10 feet), and 5.2 m (17 feet). Twelve measurements were recorded around the circumference of the pipe at hour hand intervals for an in-situ applicator with a one-outlet diverter. Cone 2 was used in the computation. Results were normalized with respect to the average caliper and range across all cross sections and are represented in FIG. 10. Normalized average caliper and range between minimum and maximum results are summarized in Table 6.

TABLE 6

Composition Thickness (One-Outlet)

| Characteristic | E4 | E5 | E6 |
|---|---|---|---|
| Cone | Cone 2 | Cone 2 | Cone 2 |
| Flow Diverter | 1-Outlet | 1-Outlet | 1-Outlet |
| Cross Section Cut (m) | 0.9 | 3.0 | 5.2 |
| Normalized Average Caliper (mm) | 1.0 | 1.0 | 1.1 |
| Normalized Range of Caliper (mm) | 0.4 | 0.3 | 0.5 |

The normalized average caliper and range of thickness of the three cross section cuts for one-outlet ejection of the composition were 1.0 mm and 0.6 mm.

Examples 7-9

Composition or Resin Caliper for a Three-Outlet Diverter

Figure 11:
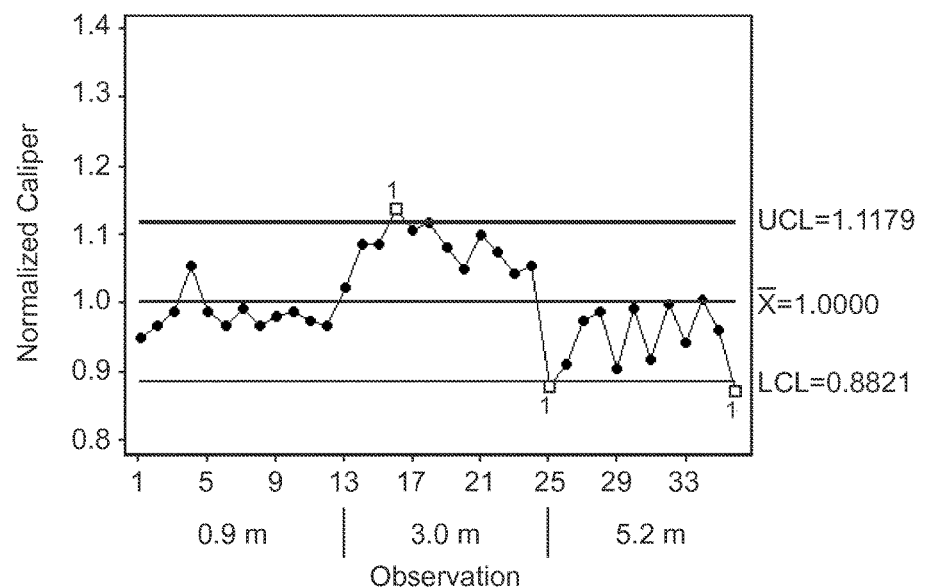
FIG. 11 is a graph of caliper measurements using a triple outlet flow diverter.

Caliper of an applied liner was determined by coating a length of pipe and cutting the pipe into three cross sections at 3 0.9 m (3 feet), 3.0 m (10 feet), and 5.2 m (17 feet). Twelve measurements were recorded around the circumference of the pipe at hour hand intervals for an in-situ applicator with a three port diverter. Cone 2 was used in the computation. Results were normalized with respect to the average caliper and range across all cross sections and are represented in FIG. 11. Normalized average caliper and range between minimum and maximum results are summarized in Table 7.

TABLE 7

Composition Caliper (Three-Outlet)

| Characteristic | E7 | E8 | E9 |
|---|---|---|---|
| Cone | Cone 2 | Cone 2 | Cone 2 |
| Flow Diverter | 3-Outlet | 3-Outlet | 3-Outlet |
| Cross Section Cut (m) | 0.9m | 3.0m | 5.2m |
| Normalized Average Caliper (mm) | 1.0 | 1.1 | 0.9 |
| Normalized Range of Caliper (mm) | 0.1 | 0.1 | 0.1 |

The normalized average caliper and range of thickness of the three cross section cuts for the three-outlet ejection of the composition were 0.9 mm and 0.1 mm. The results indicate that a three-outlet flow diverter provides improved uniformity of the resin coating compared with the one-outlet flow diverter described in Examples 4-6.

Examples 10-12

Flow Diverter Location

The position of the flow diverter in relation to the angle of the ports incident to the cone surface were determined to enhance coating uniformity. Results are summarized in Table 8. Distances were measured from the center of the flow diverter to the center of the first hole on the first row.

TABLE 8

Flow Diverter Location

| Characteristic | E10 mm | E11 mm | E12 mm |
|---|---|---|---|
| Cone | Cone 1 | Cone 2 | Cone 3 |
| Center of Flow Diverter Port to 1$^{st}$ Hole 1$^{st}$ Row at Incident Angle 90 | 8.9 | 17.8 | 22.9 |
| Center of Flow Diverter Port to 1$^{st}$ Hole 1$^{st}$ Row at Incident Angle 135 | | 15.2 | 20.3 |

Following are a list of embodiments of the present disclosure.

Item 1 is an in-situ applicator for applying a composition in a pipe, the applicator comprising:

a flow diverter configured to receive the composition and eject the composition from at least one outlet; and a hollow conical body having a narrow end, a broad end, and an interior surface configured to receive the composition ejected from the flow diverter, the conical body also having a plurality of holes, the plurality of holes forming a band that wraps circumferentially around the conical body and defines a flow region on the interior surface between the band and the narrow end, the band includes first holes adjacent to the flow region where each of the first holes has a first average diameter and second holes disposed between the first holes and the broad end, each of the second holes having an average diameter greater than the first diameter, the flow region being devoid of holes and having a first, second, third, and fourth inclined side where proximate ends of the first and second sides converge toward the narrow end and proximate ends of the third and fourth sides converge toward the narrow end in a mirror image of the proximate ends of the first and second sides.

Item 2 is the applicator of item 1, wherein the second holes include elongated holes, each having an average diameter at least twice as large as the first diameter.

Item 3 is the applicator of item 1, wherein each of a plurality of second holes adjacent the first holes is disposed offset from the first holes and between at least two of the first holes.

Item 4 is the applicator of item 1, wherein the average first diameter is based on the viscosity of the composition.

Item 5 is the applicator of item 1, wherein the average first diameter is based on the tack-free time of the composition.

Item 6 is the applicator of item 1, wherein the average first diameter is at least 1.5 mm.

Item 7 is the applicator of item 1, wherein the interior surface of the conical body includes a composition distribution zone proximate the narrow end.

Item 8 is the applicator of item 1, further including a stabilizer for coupling the hollow conical body to a rotational apparatus.

Item 9 is the applicator of item 1, wherein the hollow conical body is an open cone.

Item 10 is the applicator of item 1, wherein the hollow conical body is a closed cone.

Item 11 is the applicator of item 1, wherein the plurality of holes form a pattern on the hollow conical body configured to separate flow of the composition into at least two regions of the interior surface of the hollow conical body.

Item 12 is the applicator of item 1, wherein an inner diameter of the narrow end of the hollow conical body is greater than an outer diameter of the flow diverter.

Item 13 is the applicator of item 1, wherein the composition has a tack-free time in a range of 10-90 seconds.

Item 14 is the applicator of item 1, wherein the band of holes defines a first chevron proximate the first and second inclined sides of the flow region and a second chevron proximate the third and fourth inclined sides of the flow region, the first and second chevrons being on opposing sides of the hollow conical body.

Item 15 is the applicator of item 14, wherein the first and second chevron each comprises at least two nested rows of holes.

Item 16 is the applicator of item 15, wherein for each of the first and second chevrons, the at least two nested rows of holes includes a first row of holes adjacent to the flow region and a second row of holes disposed between the first row of holes and the broad end, each of the holes in the first row of holes having an average hole diameter smaller than an average hole diameter of each of the holes in the second row of holes.

Item 17 is the applicator of item 1, wherein the hollow conical body has a balanced construction to withstand at least 14,000 rpm when the conical body is coupled to a rotational apparatus.

Item 18 is the applicator of item 1, wherein the at least one outlet includes a first outlet having an outlet direction that is angled to eject the composition toward the interior surface of the hollow conical body, the outlet direction forming an angle greater than ninety degrees relative to an input direction along which the composition enters the flow diverter.

Item 19 is the applicator of item 1, wherein the flow region includes a flow zone having two portions, each portion bounded by a circumference of the hollow conical body at the holes closest to the narrow end and the first, second, third, and fourth inclined sides, and a ratio of surface area of the first holes and surface area of the flow zone is between 3:50 and 1:50.

Item 20 is the applicator of item 1, wherein the at least one outlet has a diameter based on the flow rate of the composition.

Item 21 is the applicator of item 1, wherein the at least one outlet has a diameter of at least 3.97 mm.

Item 22 is a method comprising:

providing the applicator of item 1;

feeding a composition to the flow diverter;

ejecting the composition from the at least one outlet to collect on the interior surface of the hollow conical body; and rotating the hollow conical body so that the collected composition flows over the flow region toward the plurality of holes and sprays outwardly from the hollow conical body through at least two of the plurality of holes.

Item 23 is the method of item 22, further comprising:

moving the applicator longitudinally along the pipe during the feeding, ejecting, or rotating.

Item 24 is the method of item 22 wherein the at least one outlet is three outlets, and the composition is ejected from each of the three outlets.

Item 25 is the method of item 24, wherein the three outlets are arranged equidistant from each other.

Item 26 is the method of item 22, wherein rotating the hollow conical body comprises driving a motor that couples to the hollow conical body through a stabilizer.

Item 27 is the method of item 22, wherein the sprayed composition forms a coating on an interior surface of the pipe, the composition coating having a thickness of at least 1 mm.

Item 28 is the method of item 22, wherein the flow region includes a composition distribution zone proximate the narrow end of the hollow conical body, and wherein the ejected composition collects selectively at the composition distribution zone before flowing over a remainder of the flow region to enhance uniformity of the composition flow.

Item 29 is an apparatus comprising:

an input tube along a first axis having a first diameter and an opening at a proximate end; and an outlet portion having a second diameter and arranged at the distal end of the input tube with a domed end transverse to the first axis, the outlet portion comprising at least two outlets arranged perpendicular to the first axis.

Item 30 is the apparatus of item 29, wherein the proximate end of the input tube is threaded.

Item 31 is the apparatus of item 30, wherein the apparatus is manually attached to a composition coating applicator.

Item 32 is the apparatus of item 29, wherein the at least two outlets each includes an outlet surface that is angled, the outlet surface angle forming an angle greater than ninety degrees relative to the first axis.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, to the extent any numerical values are set forth in specific examples described herein, they are reported as precisely as reasonably possible. Any numerical value, however, may well contain errors associated with testing or measurement limitations.

Various modifications and alterations of this disclosure will be apparent to those skilled in the art without departing from the spirit and scope of this disclosure, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

What is claimed is:

1. An in-situ applicator for applying a composition in a pipe, the applicator comprising:
    a flow diverter configured to receive the composition and eject the composition from at least one outlet; and
    a hollow conical body having a first end, a second end, and an interior surface configured to receive the composition ejected from the flow diverter, wherein the diameter of the second end is greater than the diameter of the first end, the conical body also having a plurality of holes, the plurality of holes forming a band that wraps circumferentially around the conical body and defines a flow region on the interior surface between the band and the first end, the band includes first holes adjacent to the flow region where each of the first holes has a first average diameter and second holes disposed between the first holes and the second end, each of the second holes having an average diameter greater than the first diameter, the flow region being devoid of holes and having a first, second, third, and fourth inclined side where proximate ends of the first and second sides converge toward the first end and proximate ends of the third and fourth sides converge toward the first end in a mirror image of the proximate ends of the first and second sides.

2. The applicator of claim 1, wherein the second holes include elongated holes, each having an average diameter at least twice as large as the first diameter.

3. The applicator of claim 1, wherein each of a plurality of second holes adjacent the first holes is disposed offset from the first holes and between at least two of the first holes.

4. The applicator of claim 1, further including a stabilizer for coupling the hollow conical body to a rotational apparatus.

5. The applicator of claim 1, wherein the hollow conical body is an open cone.

6. The applicator of claim 1, wherein the hollow conical body is a closed cone.

7. The applicator of claim 1, wherein the plurality of holes form a pattern on the hollow conical body configured to separate flow of the composition into at least two regions of the interior surface of the hollow conical body.

8. The applicator of claim 1, wherein the composition has a tack-free time in a range of 10-90 seconds.

9. The applicator of claim 1, wherein the band of holes defines a first chevron proximate the first and second inclined sides of the flow region and a second chevron proximate the third and fourth inclined sides of the flow region, the first and second chevrons being on opposing sides of the hollow conical body, wherein the first and second chevron each comprises at least two nested rows of holes, wherein for each of the first and second chevrons, the at least two nested rows of holes includes a first row of holes adjacent to the flow region and a second row of holes disposed between the first row of holes and the second end, each of the holes in the first row of holes having an average hole diameter smaller than an average hole diameter of each of the holes in the second row of holes.

10. The applicator of claim 1, wherein the at least one outlet includes a first outlet having an outlet direction that is angled to eject the composition toward the interior surface of the hollow conical body, the outlet direction forming an angle greater than ninety degrees relative to an input direction along which the composition enters the flow diverter.

11. The applicator of claim 1, wherein the flow region includes a flow zone having two portions, each portion bounded by a circumference of the hollow conical body at the holes closest to the first end and the first, second, third, and fourth inclined sides, and a ratio of surface area of the first holes and surface area of the flow zone is between 3:50 and 1:50.

12. A method comprising:
    providing an applicator as claimed in claim 1;
    feeding a composition to the flow diverter;
    ejecting the composition from the at least one outlet to collect on the interior surface of the hollow conical body; and
    rotating the hollow conical body so that the collected composition flows over the flow region toward the plurality of holes and sprays outwardly from the hollow conical body through at least two of the plurality of holes.

13. The method of claim 12, further comprising:
    moving the applicator longitudinally along the pipe during the feeding, ejecting, or rotating.

14. The method of claim 12 wherein the at least one outlet is three outlets, and the composition is ejected from each of the three outlets, wherein the three outlets are arranged equidistant from each other.

* * * * *